Figure 1:
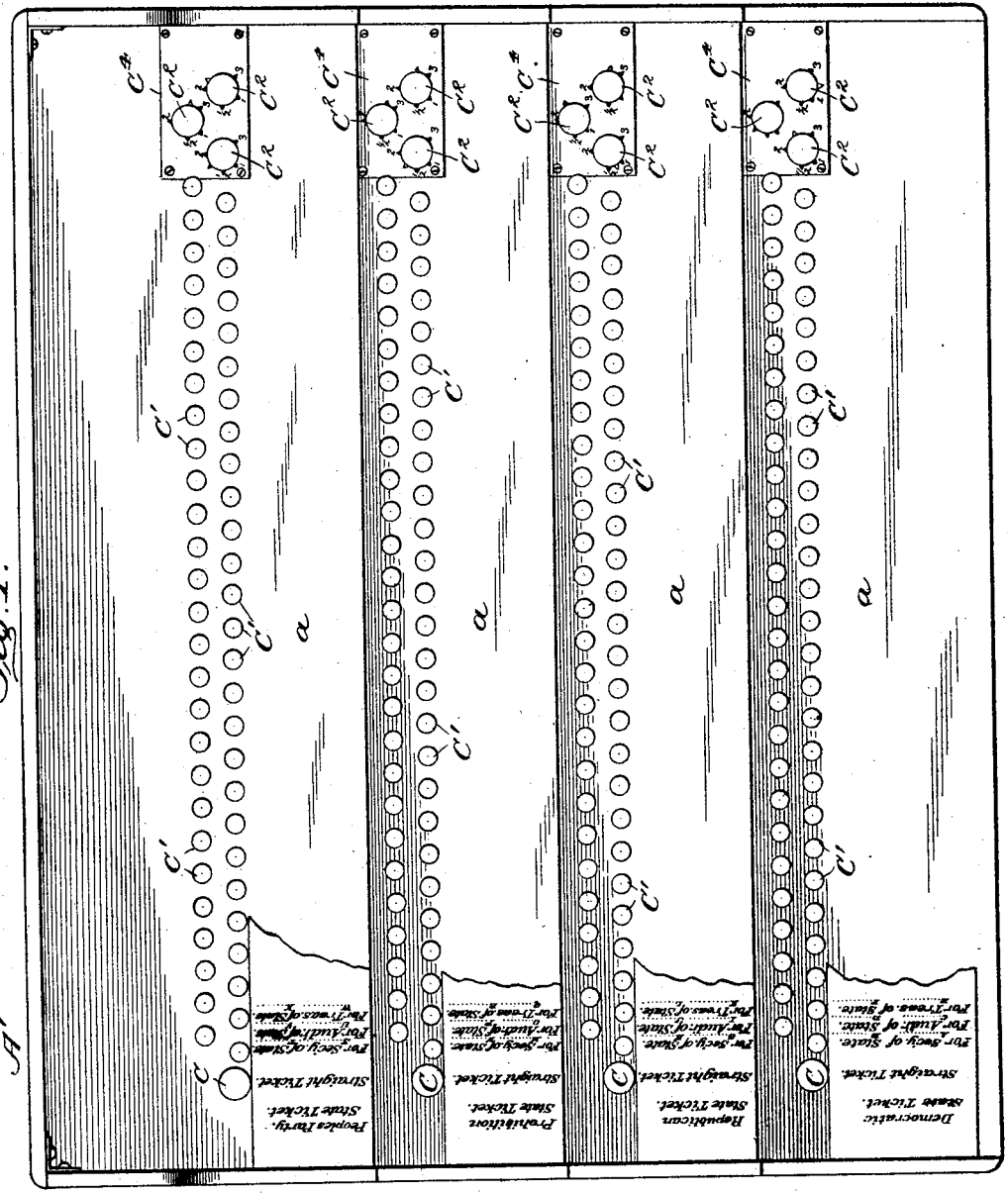

No. 613,338. Patented Nov. 1, 1898.
A. TURNER.
VOTING MACHINE.
(Application filed Apr. 22, 1896.)
(No Model.) 8 Sheets—Sheet 1.

WITNESSES: INVENTOR:

No. 613,338. Patented Nov. 1, 1898.
A. TURNER.
VOTING MACHINE.
(Application filed Apr. 22, 1896.)
(No Model.) 8 Sheets—Sheet 2.
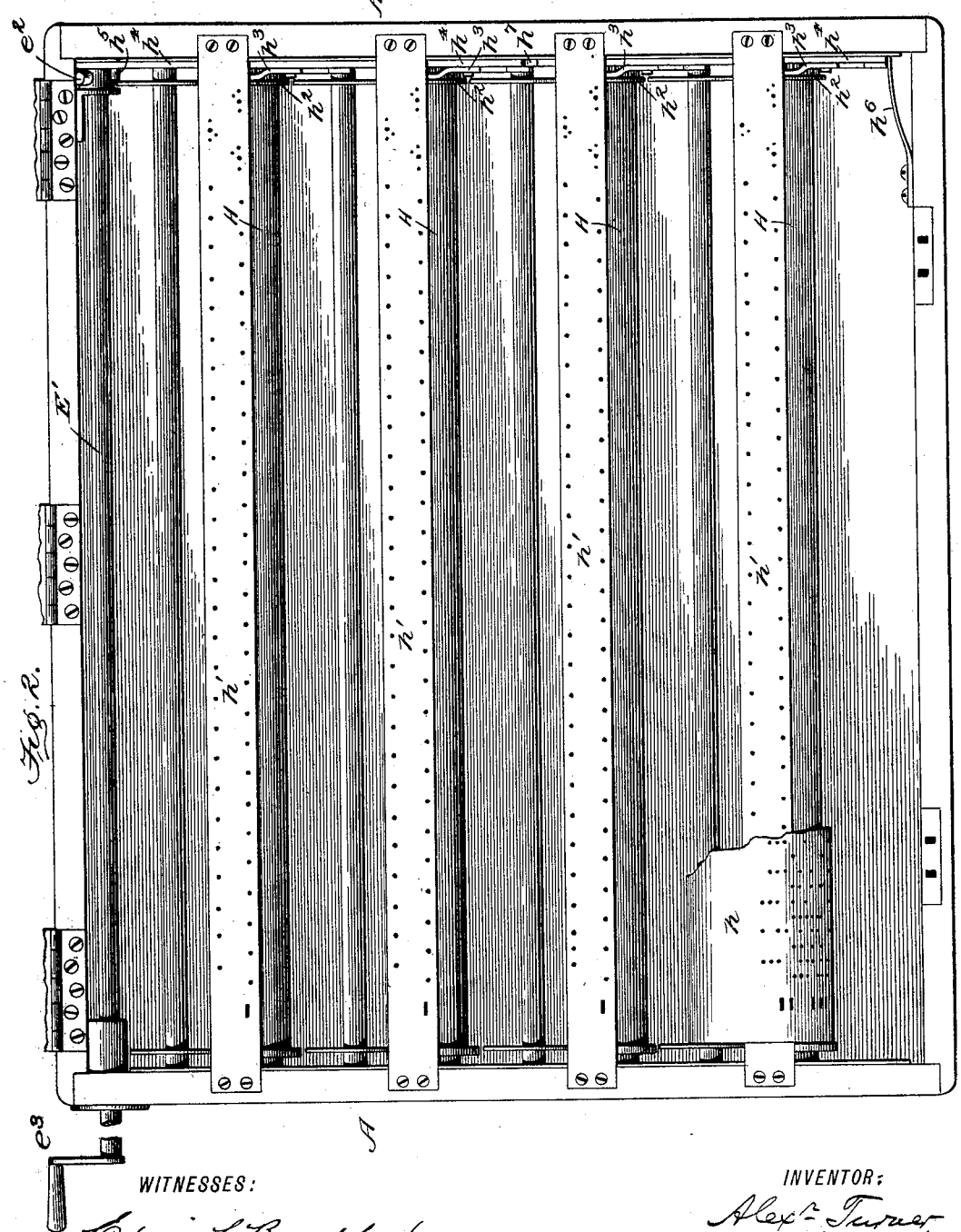
WITNESSES:
Edwin L. Bradford
C. M. Sweeney.
INVENTOR:
Alex. Turner,
BY
Henry Calvert,
ATTORNEY.

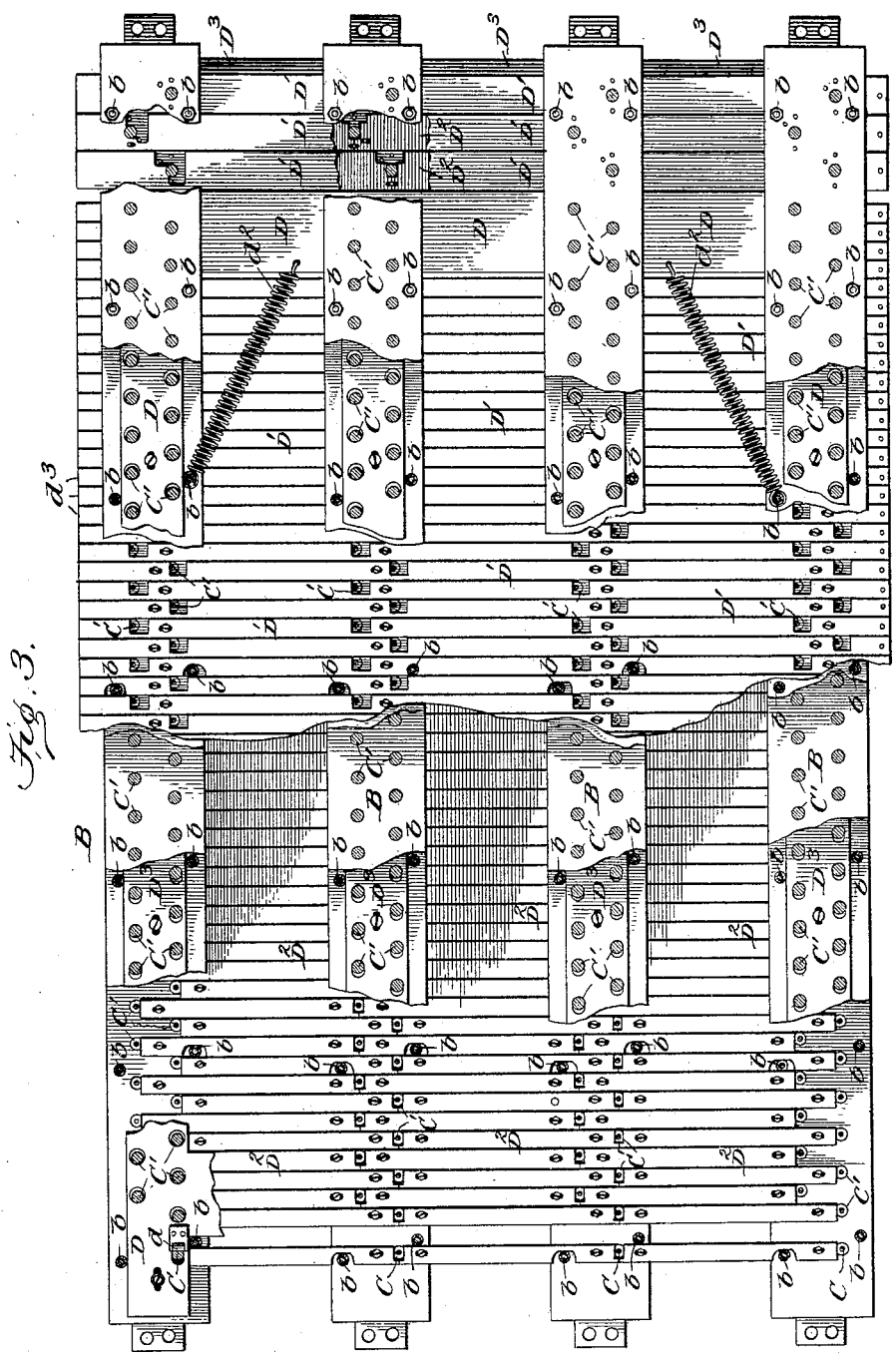

No. 613,338. Patented Nov. 1, 1898.
A. TURNER.
VOTING MACHINE.
(Application filed Apr. 22, 1896.)
(No Model.) 8 Sheets—Sheet 4.
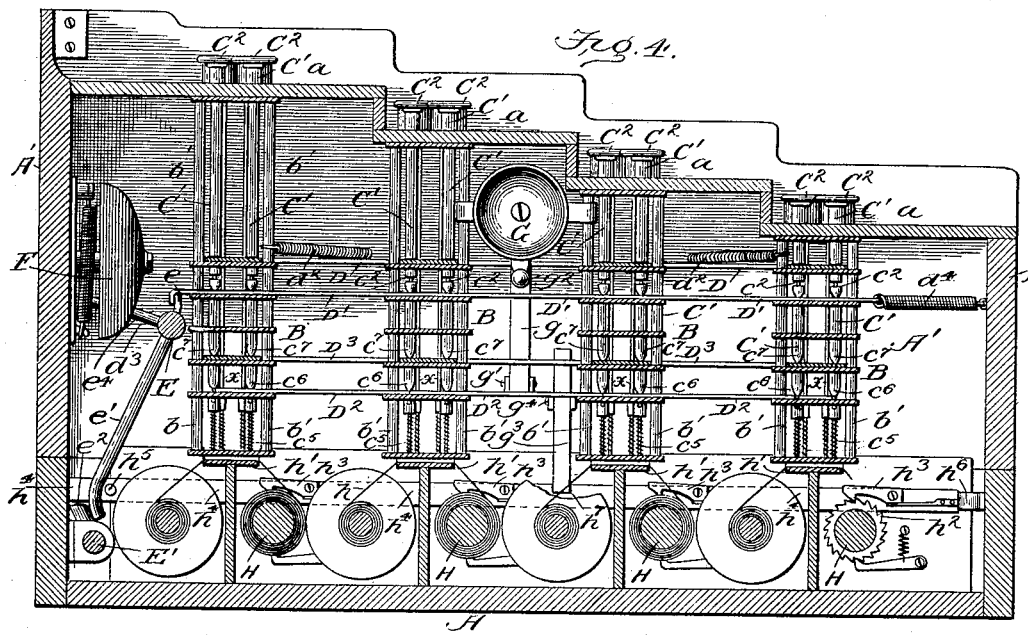
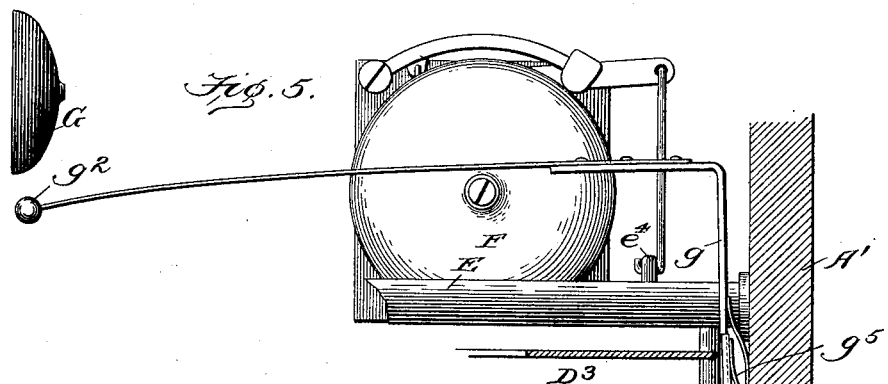
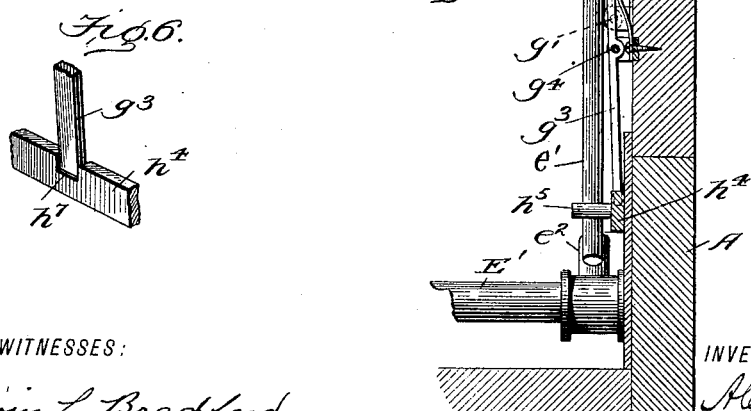
WITNESSES:
Edwin L. Bradford
C. M. Sweeney.
INVENTOR:
Alex. Turner
BY
ATTORNEY.

No. 613,338. Patented Nov. 1, 1898.
A. TURNER.
VOTING MACHINE.
(Application filed Apr. 22, 1896.)

(No Model.) 8 Sheets—Sheet 5.

WITNESSES:
Edwin L. Bradford
C. M. Sweeney

INVENTOR:
Alex. Turner
BY
Henry Calver
ATTORNEY.

No. 613,338.   Patented Nov. 1, 1898.
A. TURNER.
VOTING MACHINE.
(Application filed Apr. 22, 1896.)

(No Model.)   8 Sheets—Sheet 6.

WITNESSES:
Edwin L. Bradford
C. M. Sweeney

INVENTOR:
Alex. Turner
BY
Henry Calver
ATTORNEY.

No. 613,338. Patented Nov. 1, 1898.
A. TURNER.
VOTING MACHINE.
(Application filed Apr. 22, 1896.)
(No Model.) 8 Sheets—Sheet 7.
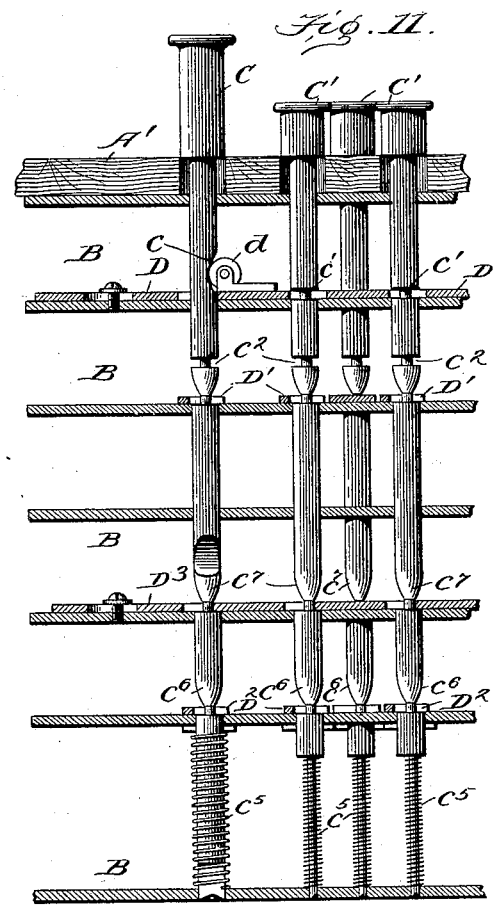
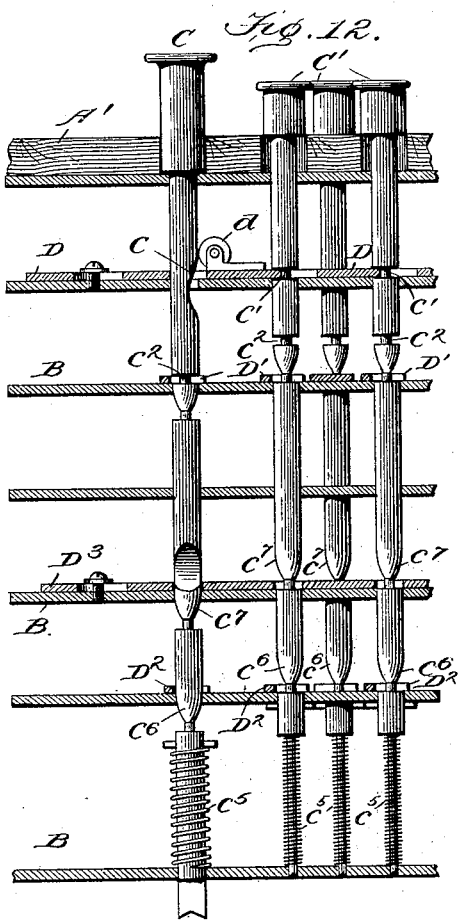
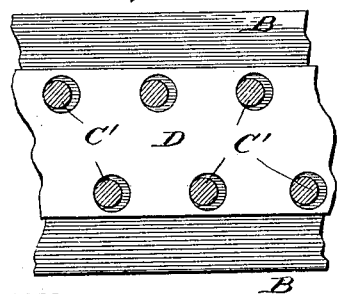
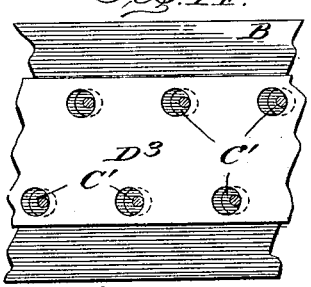
WITNESSES: Edwin L. Bradford
C. M. Sweeney.
INVENTOR:
Alex. Turner
BY Henry Calver
ATTORNEY.

No. 613,338. Patented Nov. 1, 1898.
A. TURNER.
VOTING MACHINE.
(Application filed Apr. 22, 1896.)
(No Model.) 8 Sheets—Sheet 8.
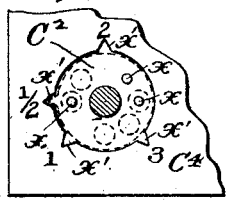
Fig. 18.
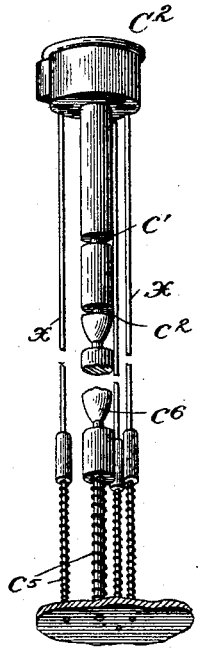
Fig. 17.
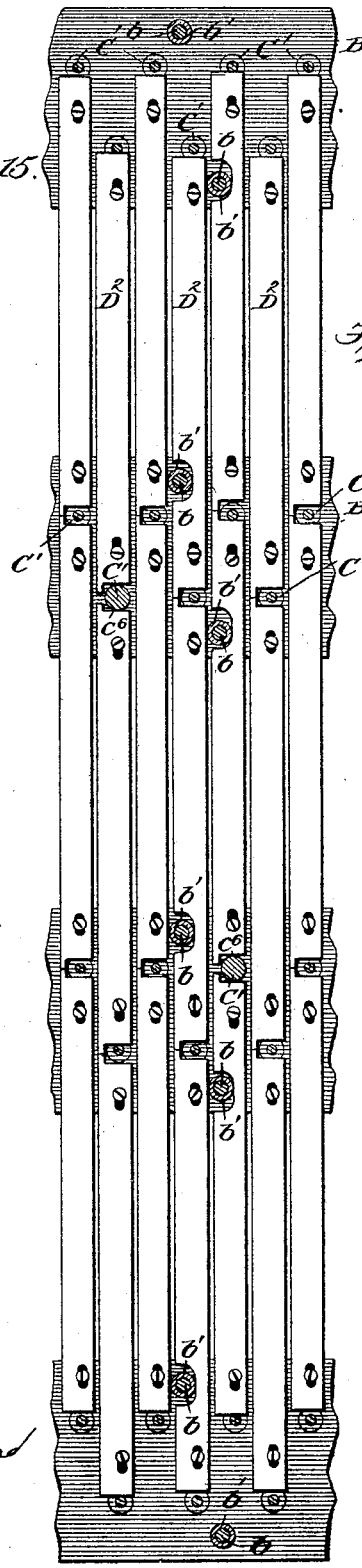
Fig. 15.
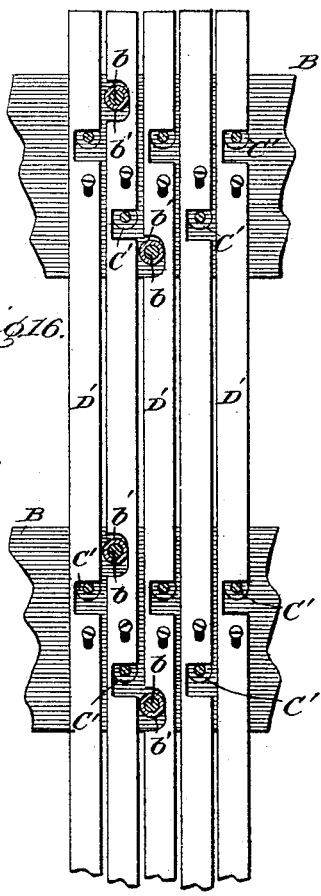
Fig. 16.
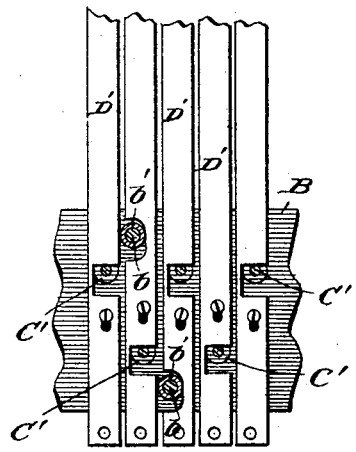
WITNESSES:
Edwin L Bradford
C. M. Sweeney
INVENTOR:
Alex. Turner
BY
Henry Calvert
ATTORNEY.

UNITED STATES PATENT OFFICE.

ALEXANDER TURNER, OF INDIANAPOLIS, INDIANA, ASSIGNOR OF ONE-HALF TO J. D. ADAMS, OF SAME PLACE.

VOTING-MACHINE.

SPECIFICATION forming part of Letters Patent No. 613,338, dated November 1, 1898.

Application filed April 22, 1896. Serial No. 588,609. (No model.)

*To all whom it may concern:*

Be it known that I, ALEXANDER TURNER, a citizen of the United States, residing at Indianapolis, in the county of Marion and State of Indiana, have invented certain new and useful Improvements in Voting-Machines, of which the following is a specification, reference being had therein to the accompanying drawings.

My invention relates to that class of voting-machines adapted to be used in connection with the Australian-ballot system of secret voting; and it has for its object to provide a voting-machine which will automatically register the number of votes cast in favor of any or all candidates for election, to provide a machine of such construction that only the person voting will know for which party or candidate he has cast his ballot, and to provide a machine in the use of which "repeating" will be absolutely impossible, but which will at the same time permit an elector to vote either a straight or a mixed or scratched ticket, or, in other words, to cast his vote for a part of the candidates on any one ticket and a part of the candidates on any one of several other tickets, but by means of which he cannot, in so doing, cast more than one vote for one office either by accident or design, although there may be several candidates for such office.

My improved machine also provides means by which votes may be registered in those States in which the laws provide for cumulative voting for minority representation by permitting each party to have several candidates for certain representative offices and permitting each voter to cast one vote for each one of said candidates or to cast for one candidate all the votes which he is entitled to cast or to divide his votes fractionally or otherwise among the several candidates for such offices.

In carrying my invention into effect I provide an outer casing, preferably of wood and made in two sections, one of which is in practice hinged to the other. The lower of these sections is to contain the tally-sheets, the rollers on which the same are wound, and the operating mechanism for said rollers, whereby after each voter has cast his ballot the said sheets may be advanced when the inspector or supervisor sounds the alarm to indicate that a person has voted. The upper of these sections contains the operating mechanism of the machine and supports the operating-keys, the lower ends of which serve as punches to perforate the tally-sheets, and the top of said upper section serves as a keyboard, on which are arranged, adjacent to the heads or buttons of the operating-keys, the ballots for the several parties, with the names of the candidates thereon arranged opposite to the said heads or buttons. By hinging the upper section to the lower section ready access is afforded to the latter in inserting or removing the tally-sheets or to provide for the ready inspection of the latter at any time should it be desired to do so.

For use in general elections two sets of voting-keys are provided, one set comprising what I will term the "straight-ticket" keys, in that these are the keys which will be operated by a voter who wishes to cast his ballot for a straight party-ticket, while the other keys are what I term "candidate-keys," in that they provide means whereby a voter may vote a split or mixed ticket, or, in other words, may "scratch" any desired number of candidates on the ticket which he may prefer to vote generally and may substitute therefor candidates on other tickets for such offices as he may have scratched from his general ticket.

I provide, in connection with the straight-ticket keys, a locking-slide whereby when any one of these keys shall have been depressed by the voter all of the candidate-keys will be locked in their upper positions, so that no one of them can be depressed by the voter, thereby absolutely preventing a voter from casting any individual-candidate votes in addition to his straight-ticket vote. If, on the contrary, any one of the candidate-keys be first depressed, it will hold said slide immovable, so that a straight-ticket key cannot be operated until the machine has been reset. I also provide, in connection with both the straight-ticket keys and the candidate-keys, locking-slides which when either a straight-ticket key or a candidate-key has been depressed will absolutely prevent any other straight-ticket key or any candidate-key in the same series or representing the candidate for the same office from being depressed, so that it will be impossible for a voter to repeat either a straight-ticket vote or a candidate-vote. I also preferably provide an alarm which is to be sounded either when a straight-ticket key or a candidate-key is depressed, said alarm being, however, sounded but once by the voter, no matter how many candidate-keys he may operate. In other words, when any one of the many candidate-keys is depressed the alarm will be sounded by the operation of the first candidate-key which may be depressed, but will be inoperative thereafter until the machine has been reset after the voter has left the voting-booth. I also provide a series of locking-catches whereby when any straight-ticket or candidate key has been depressed it will be retained in its lowered position until the machine is reset by the inspector or supervisor, and thus, owing to these catches and to the locking-slides above referred to, repeating will be absolutely prevented.

The keys by which the cumulative or fractional votes may be cast and registered for certain candidates are also controlled by locking-slides, one slide for each series of keys, the same as for the straight-ticket and candidate keys, and they are also held down by locking-catches in the same manner as are the other keys.

After any one or any desired number of keys have been operated by the voter, or, in other words, when a voter has cast his ballot and has left the booth, the machine will be reset by the inspector by means of a releasing device, preferably consisting of a rocking bar provided with a radial projection or projections engaging hooks or downturned lips on the said locking-catches to move them slightly longitudinally to release them from the annular grooves in the sliding rods or shanks of the operating-keys, and thereby permitting the springs surrounding the lower parts of the latter to force them upward into their initial positions. When these locking-latches are thus operated by the inspector or supervisor to reset the machine, a loud alarm is at the same time sounded, and simultaneously with the resetting operation the tally-sheets are fed forward to change their positions to register the ballot of the next voter.

Figure 7:
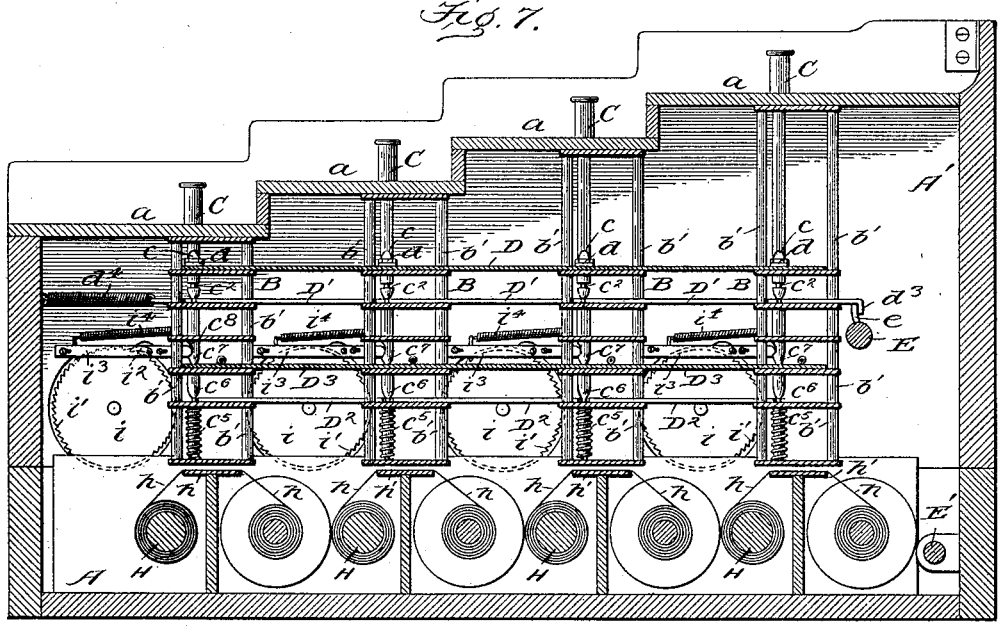
Figure 9:
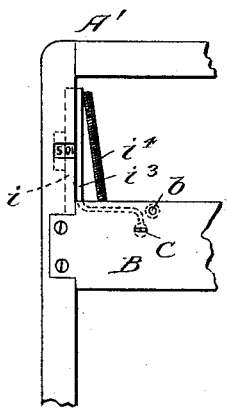
Figure 8:
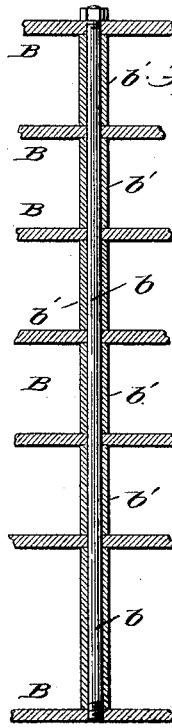
Figure 10:
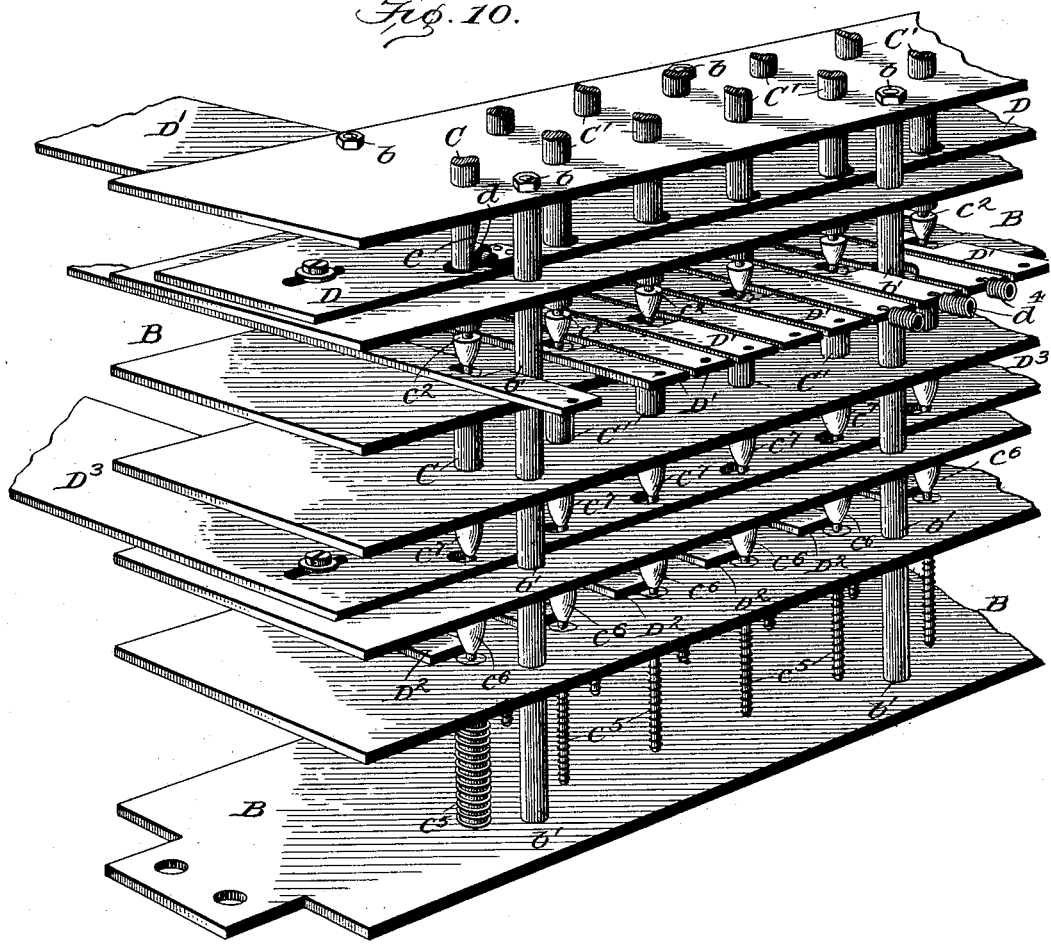

In the accompanying drawings, Figure 1 is a top plan view of my improved machine. Fig. 2 is a plan view of the lower part of the casing with the mechanism contained therein. Fig. 3 is a broken-out plan view with the keys in horizontal section. Fig. 4 is a transverse vertical section of the machine. Fig. 5 is an enlarged detail to show the alarm-gongs and their operating mechanism. Fig. 6 is a detail view of a portion of the sliding bar which carries the pawls which operate the paper-feeding mechanism to show the locking-notch therein. Fig. 7 is a vertical section looking in an opposite direction from the point of view of Fig. 4. Fig. 8 is a detail to show a portion of the metallic frame and one of the holding-bolts therefor with the collars thereon. Fig. 9 is a detail bottom view showing a portion of one of the registering devices for the straight-ticket keys. Fig. 10 is an enlarged perspective view to illustrate the operation of the various slides and catches which coöperate with the keys. Figs. 11 and 12 are sectional elevations illustrating the mechanism shown in Fig. 10. Figs. 13 and 14 are detail views to illustrate the operation of the slide by which the candidate-keys are locked out of action when the straight-ticket key is operated and which also locks the straight-ticket keys when any one of the candidate-keys is operated. Fig. 15 is a detail enlarged view of the slides by which when one key of a series or set is operated the others will be locked out of action. Fig. 16 is an enlarged detail showing some of the locking-catches which retain the keys in their lowered positions. Figs. 17 and 18 are detail views to illustrate the operation of the cumulative keys.

Referring to the drawings, A denotes the base of the wooden casing, to which is hinged the keyboard or top portion A', having a series of platforms $a$ preferably arranged in different horizontal planes and on which are to be pasted or otherwise attached the several tickets containing the names of the candidates to be voted for. Within the casing A' is arranged a metallic framework B, preferably consisting of a series of iron plates suitably supported at their ends on the said casing A' and separated from each other and at the same time properly secured together, as by bolts $b$ passing through the same, said bolts being provided with collars or sleeves $b'$ of greater diameter than said bolts and of the holes in plates of the framework B, through which the said rods pass, so as to hold said plates properly separated from each other.

C denotes what I term the "straight-ticket" keys, which are preferably placed at one end of the machine, said keys consisting of vertically-movable sliding rods passing through holes in the framework B and being of suitable length to be forced downward through the tally-sheets arranged in the lower part of the casing, the lower end of said rods being formed as rectangular punches to make suitable perforations in said tally-sheets. One straight-ticket key is of course provided for each ticket in the field.

C' denotes the candidate-keys, which are also guided vertically in the framework B and which are also of suitable length to extend downward into the lower part of the case to punch the tally-sheets, said candidate-keys being in series corresponding in number to the number of offices to be filled, the total number of said keys corresponding to the number of the candidates on each ticket multiplied by the number of tickets.

D denotes a locking-slide which is preferably provided with rollers $d$, engaging suitable inclines $c$, formed on the straight-ticket keys C. Said slide D is provided with openings corresponding in number to the number of all of the candidate-keys C', the lower ends of which are formed as round punches and the rods or stems of which are provided with annular recesses $c'$, registering with said openings in such a manner that when a straight-ticket key is depressed said slide will be moved slightly horizontally into said recesses $c'$, so as to lock all of the candidate-keys so that no one of them can be operated in addition to a straight-ticket key. The slide D is retracted by springs $d^2$, which will restore it to its normal position after it has been released at the upward movement of the key C', by which it was moved in resetting the machine. If, on the contrary, a candidate-key be first depressed, a full part of the stem of such key will enter the opening in said slide through which said stem passes, so that said slide will thereafter be immovable until the machine has been reset, and said slide will in such circumstances lock all of the straight-ticket keys, as their inclines $c$, engaging the rollers $d$ without any looseness or play, will prevent the straight-ticket keys from descending.

The slide D is preferably made in the form of a skeleton plate, which, as herein shown, (see Fig. 3,) consists of four longitudinal plates or bars joined at or near their ends by cross plates or bars, the outline of the said slide as a whole being thus nearly equal in extent to the entire internal mechanism of the machine.

All of the keys C and C' are provided with annular recesses or locking-notches $c^2$, which when said keys are depressed will be engaged by spring-retracted catches D', supported upon one of the plates of the framework B and provided at their rear ends with down-turned portions or hooks $d^3$ to be engaged by pins or other suitable projections $e$, formed on or attached to a releasing rocking bar E, provided with a depending arm $e'$, engaged at its lower end by a projection $e^2$ on a lower rocking bar or rod E', suitably supported in the base A of the machine and which has fitted to it a removable crank or key $e^3$ to be operated by the inspector after a voter has cast his ballot, so that by partially rotating the said lower rocking bar E' by said crank or key the upper rocking bar E will also be operated to withdraw the spring-retracted locking-catches D' from the notches $c^2$ in the keys C and C' against the stress of the springs $d^4$, and when these locking-slides are thus sufficiently withdrawn from the notches of the keys the latter will be forced upward by the springs $c^5$, surrounding the lower ends of all of the said keys. The rocking bar E is also preferably provided with an arm $e^4$, by which the loud-sounding gong F is rung when the inspector resets the machine, as above described, so that all interested persons in the vicinity may know that the machine is properly reset for the next voter.

The machine herein illustrated is constructed to accommodate four different tickets, although my improved machine may be made in different sizes to accommodate a greater or less number of tickets, according to circumstances. Thus it will be seen by reference more particularly to Fig 1 that there are four straight-ticket keys and four sets of candidate-keys, or, in other words, there is a series comprising four straight-ticket keys and a large number of series of candidate-keys with four keys in each set or series. To prevent a voter from operating more than one key of any one series, I provide each series of keys with locking-slides, consisting, as herein shown, of independent or sectional bars or plates $D^2$, arranged opposite conically-formed portions $c^6$ on the straight-ticket and candidate keys C and C', the locking-slides $D^2$ of a series or set of keys having a sufficient looseness or play between them, as will be more clearly apparent by reference to Fig. 15, to permit any one key of a series to be depressed; but when one key of a series has been thus forced downward in registering a vote these locking-slides will be moved endwise far enough to effectually lock all of the other keys of such series and prevent them from being forced downward should a voter attempt to repeat or multiply his vote either by depressing any additional straight-ticket key or any other candidate-key in the same series as the key already depressed. The conical portions on the several keys permit these slides to readjust themselves after having been moved without the use of springs.

It will be seen by reference to Fig. 15 of the drawings that the outer ends of the outer sectional bars or plates $D^2$ are arranged to abut against the stems of the outer keys C or C' or $C^2$, in connection with which they are used, so that each series of locking-slides $D^2$ is thus bounded by the rods or stems of the keys, which thereby serve to positively limit the endwise movements of these locking-slides. As there is only looseness enough allowed between the stems of the keys by which the outer ends of the slides are thus positively limited to permit but one key of the series to be depressed at once it will be obvious that it will be impossible for any fraud or irregularity to be practiced in any attempt which might be made to register votes for two or more tickets, for if it be attempted to force down two keys at once they can only be forced part way down and cannot, therefore, register at all. This positive limitation of the outer ends of the locking-slides is therefore regarded as an important feature of my invention.

It is desirable that the inspector outside of the booth in which the voting-machine may be placed should know whether or not a voter who may have entered the booth has cast his vote at all, and to this end I preferably provide a light-sounding bell or gong G, which when any one of the keys C or C' has been operated to register a vote may be sounded, this being effected by means of a slide $D^3$, which will be moved horizontally by conical portions $c^7$ on the keys C and C' when any one of said keys is depressed, said slide operating a lever $g$, pivoted at its lower end at $g'$ to a suitable support on the framework A', and is provided at its upper end with a horizontal arm carrying a suitable hammer $g^2$ to sound the bell or gong G. When this slide $D^3$ has been moved to sound the bell or gong G, it will be locked in position by the key by which it is operated, so that said bell or gong will not be operated a second time until the machine is reset.

It is desirable, to provide against fraud and also in order that there shall be no discrepancy between the record as shown by the tally-sheet as to the total number of votes cast and a record of the voters which may be kept by a tally-clerk who may count the voters as they pass into the booth or who may base his count as to the number of times that the gong F is sounded by the inspector in resetting the machine, that it should be impossible for the inspector to sound the said gong a second time without a vote having been cast, and to this end I provide a locking device for the resetting mechanism, by which resetting mechanism said gong F is sounded. This locking mechanism in the form of my invention herein shown consists of a latch $g^3$, pivoted at $g^4$, the lower end of said latch being arranged to enter a notch $h^7$ in the sliding bar $h^4$ to hold said sliding bar immovable. The lower end of said latch is moved to throw the same into engagement with said notch by a spring $g^5$ pressing upon the upper end of said latch and holding said upper end in engagement with the slide $D^3$, by the movement of which the light-sounding bell or gong G is sounded. Thus when the said slide $D^3$ is moved by the depression of any one of the straight-ticket or candidate keys said latch will be turned on its pivot to withdraw its lower end from the said notch $h^7$ in the sliding bar $h^4$. When the said sliding bar $h^4$ is locked, it will be impossible for the inspector to turn the rocking bar E' far enough to cause the loud-sounding bell or gong F to be rung or to reset the machine for another vote.

In the base A of the machine are arranged the rollers H, on which the paper $h$, which is to form the tally-sheets, is wound, this paper running over plates $h'$, formed with suitable openings for the passage of the lower ends of the keys C and C', which lower ends thus form punches to perforate the said paper. These rollers H are provided with ratchet-wheels $h^2$, operated by pawls $h^3$, carried by a sliding bar $h^4$, having a pin $h^5$, which is engaged by the depending arm $e'$ of the rocking bar E, so that when the lower rocking bar E' is operated by the inspector to reset the machine, as above described, the projection $e^2$ thereon will engage the said arm $e'$ and by forcing the latter against the pin $h^5$ will move said sliding bar forward in opposition to its returning-spring $h^6$ to cause the said pawls to turn said ratchet-wheels to feed forward the paper constituting the tally-sheets.

Four sets of rollers carrying four different tally-sheets are herein shown; but if it be desired not to use any one of these tally-sheets any one of the pawls $h^3$ may be rendered inoperative by being turned over backward out of engagement with its respective ratchet-wheels, so that only the tally-sheets which are in use will be fed forward.

Several sheets of paper may be wound upon each set of rollers H, so that any desired number of tally-sheets can be made at the same time for the purpose of providing duplicate or several similar tally-sheets, which can be deposited with different officers connected with the election and one still be left in the machine, thereby providing against a loss of the record by destruction of any one or more of these tally-sheets.

In elections as they usually run about eighty-five per cent. of the votes cast are straight-ticket votes, and it is therefore desirable that these votes should be individually recorded. To this end I preferably provide each of the straight-ticket keys of my machine with a registering device which in itself may be of well-known construction and the main or operating numeral-wheel $i$ of which is furnished with a ratchet-wheel $i'$, operated by a pawl $i^2$, carried by a sliding bar $i^3$, one end of which is held in engagement with an inclined portion $c^8$, formed on the straight-ticket key C, by a spring $i^4$, so that each time such straight-ticket key is depressed said ratchet-wheel will be turned to the extent of one tooth to operate the register, the numerals of which can be arranged to show through a suitable opening in the casing of the machine. It will be understood that, if desired, each of the candidate-keys may be provided with registers similar to those just described and operated in a similar manner.

The straight-ticket keys as herein shown are formed with rectangular lower ends or punches to punch rectangular holes in the tally-sheets, while the candidate-keys are formed round to punch round holes, so that the registering-marks made by these keys will differ from each other for the purpose of making the registering-marks of the two kinds of keys different and distinctive.

$C^2$ indicates what I will term the "cumulative" keys, in that said keys may, if the voter so wishes, be placed in such position as to register a cumulative vote, which he may be entitled to cast for a representative candidate, or may be so adjusted as to register a fractional vote or a single vote, according to its position of adjustment. In the machine herein illustrated three of these cumulative keys are shown, this particular construction being adapted for use in some States the laws of which provide for minority representation by permitting the voters of a representative district in which they could not hope to elect the full number of representatives to which such district might be entitled to cast their votes cumulatively for one or two of the three candidates, so as to secure the election of at least one of the three representatives for such district. Thus a voter may cast all three votes for the same candidate, or may cast two votes for one candidate and one for another candidate, or may cast one and a half votes for each of two candidates instead of casting one vote for each of the three candidates, or may otherwise fractionally divide his votes as he may see fit. To properly register these cumulative or fractional votes, each of the cumulative keys is adapted to operate in addition to the punch which it carries or which it actuates one or more auxiliary keys or punches $x$. The head of the main or cumulative key is adapted to be turned in different positions and its stem may turn therewith, or said head may turn on the stem. The plate $C^4$, into which the head of the cumulative keys descends, is in the form of my invention herein shown provided with several notches, and the said key is provided with a projection or index which may by turning the said key be brought into register with any one of these notches. Adjacent to this main cumulative key and beneath the head thereof are arranged the auxiliary keys or punches $x$, one or more of which may be depressed with the main key, according to the position of adjustment of the latter. These auxiliary keys or punches are grouped about the main key and the head of the latter is provided with recesses which are so arranged that when said head is in such position that when only one vote is to be registered all of said auxiliary keys will be beneath said recesses, so that only the main cumulative key will be depressed; but by varying the axial position of the latter to bring the projection or index thereon into register with any one of the notches $x'$ such a number of the auxiliary keys will be depressed as will make the register-holes in the tally-sheet correspond to the number placed on the plate $C^4$ opposite such notch. The auxiliary keys, which indicate the fractional votes, will preferably be so placed as to punch the tally-sheet out of line with the punch-holes made by the keys which indicate the whole or integral numbers.

Each series of cumulative keys extending from front to rear of the machine has its set of locking bars or plates $D^2$ the same as the straight-ticket and candidate keys, so that when one of these cumulative keys has been depressed it will be impossible to operate any other cumulative key in the same series.

As heretofore stated, the lower ends of all of the keys C C' $C^2$ are formed as punches, so as to cut holes in the tally-sheets when the said keys are depressed, and in order that these punches may cut the paper better than they would be if cut off square at their ends they are preferably notched out or formed with V-shaped notches at their lower ends, as the straight-ticket keys C are more clearly shown in Figs. 11 and 12 of the drawings, although it will be understood that the other keys C' $C^2$ also are or may be formed in the same way.

It will be understood that by providing the cylindrical rods or stems of the keys C C' $C^2$ with conical portions, by which the slides D' $D^2$ $D^3$ are operated, said conical portions of said stems or rods will always operate said slides no matter what may be the axial positions of said keys, and therefore by making these operating portions of these stems or rods conical no special means need be provided for holding the keys in any particular positions. Also by making the locking-notches C' $C^2$ in the form of annular recesses it will be understood that these notches will also always be in proper position to receive the locking devices which are to enter said recesses whatever may be the axial positions of the stems or rods in which said notches are formed.

It will be understood that my improved machine is preferably to be used in connection with what is known as the "Australian" or "secret" ballot system of voting, and to this end the machine will be placed in a compartment or booth into which the intending voter can enter alone, the inspector or supervisor who is to reset the machine after each vote has been registered being outside of said booth, and the crank or key $e^3$, which is to be operated by the inspector, being of course outside of the booth or compartment. The person wishing to vote enters the compartment, and if he desires to vote a straight party-ticket he simply pushes down that one of the straight-ticket keys which is placed adjacent to the head of the ticket which he wishes to vote and his vote is registered on the tally sheet or sheets corresponding to such key by punching a hole in said sheet or sheets. In thus operating one of the straight-ticket keys all the other straight-ticket keys will be locked, so that they cannot be depressed, by the locking-plates $D^2$, extending from front to rear of the machine in the line of said straight-ticket keys, while by thus depressing one of said straight-ticket keys all of the candidate-keys will be locked, so that they cannot be depressed, by means of the locking-slide D, operated in the manner above described. If instead of voting a straight party-ticket a voter wishes to cast his ballot for a mixed or scratched ticket, he will depress such of the candidate-keys as are adjacent to the names of the candidates on any of the tickets which he may wish to vote for, but in so doing, owing to the locking-slides $D^2$, running from front to rear of the machine in a line with each series of candidate-keys, it will be impossible for him after he has depressed a candidate-key which registers his ballot for a candidate for any particular office to depress any other candidate-key in the same series, and thus in the use of my machine it will be impossible for a voter to vote for more than one candidate for such office, and as none of the keys can be depressed a second time to register a second vote until the machine has been reset by the inspector it will be obvious that repeating either for parties or candidates will be absolutely impossible. When a person voting a mixed or scratched ticket has registered his vote for such of the candidates as he may wish to vote for on other tickets than the party-ticket which he may prefer, he will then complete his ballot, if he so desires, by depressing all of the candidate-keys adjacent to his preferred ticket except those which represent candidates for offices for which he has already voted, this operation of all the individual-candidate keys being necessary, if he wishes to vote for the candidates for all the offices, by reason of the fact that after one candidate-key has been depressed the straight-ticket keys will have been locked, as hereinbefore described. In operating either a straight-ticket key or a candidate-key the light-sounding bell or gong G will be rung by the movement of the slide $D^3$, as hereinbefore described, so that the inspector, who may be closely adjacent to the machine, will be informed that the elector has cast his vote either for a straight party-ticket or for one or more candidates on one or more tickets. The voter now passes from the voting-booth and the machine is reset for the next voter by the inspector or supervisor by giving a partial turn to the crank or key $e^3$, which withdraws the locking-catches $D'$ from the key or keys depressed by the voter and which have been locked by said catches in their lowered positions, thus leaving said catches free to be restored to their normal positions by their springs $d^4$. When the inspector thus resets the machine, he also rings the loud-sounding bell or gong F by reason of the connections above described between the rocking bar $E'$ and the said gong or bell, so that all interested persons in the vicinity may know that the machine has been properly reset for the next voter. In thus resetting the machine the inspector also feeds forward the tally-sheets by reason of the above-described connections between the rollers on which said sheets are wound and the said rocking bar $E'$.

The cumulative keys $C^2$, operating in the manner hereinbefore described, are independent of the straight-ticket and candidate keys and may be operated to cast the cumulative or fractional representative votes either before or after the straight-ticket or candidate keys have been operated.

Having thus described my invention, I claim and desire to secure by Letters Patent—

1. In a voting-machine, the combination with the keys thereof and locking devices or catches by which said keys, when once depressed, are locked in their lowered positions, where they will remain until the machine has been reset, of an audible alarm, a resetting device by which the said locking devices or catches are released, and a locking device for the said resetting device which locking device renders said resetting device inoperative until one or more of said keys has been depressed to register a vote.

2. In a voting-machine, the combination with the keys thereof, of a bell or gong, a hammer for sounding said bell or gong, a movable device, as slide $D^3$, engaged by all of the keys of the machine so that when any one of said keys is depressed said device will be moved to sound the said gong, intermediate operating connections between the said movable device and the said hammer, and means whereby said movable device will be locked in place when it has once been moved so that it cannot return to move a second time until the machine has been reset, whereby the said bell or gong can be sounded but once for each voter.

3. A voting-machine provided with special keys for cumulative or fractional voting, each of said keys being provided with a horizontally-movable or revoluble head having an index, combined with an index-plate having marks at certain points with which said index may be caused to register, auxiliary keys grouped about each main cumulative key, and any desired number of which auxiliary keys may be rendered operative by the said head to register a vote according to the position of adjustment of the latter.

4. A voting-machine provided with special keys for cumulative or fractional voting, each of said keys having a rotatively-movable head provided with an index, combined with auxiliary keys grouped in sets about the main keys, and an index-plate having marks to indicate the number of votes to be cast, and which auxiliary keys are rendered operative or inoperative according to the rotative position of adjustment of the said head.

5. A voting-machine provided with special keys for cumulative or fractional voting, each of said keys having a rotatively-movable head provided with an index, combined with auxiliary keys grouped in sets about the main cumulative keys, and an index-plate having marks to indicate the number or fractional number of votes to be cast, and which auxiliary keys are rendered operative or inoperative according to the rotative position of adjustment of the said head, said cumulative or fractional voting-keys being arranged in sets or series, the number in each set or series corresponding to the number of tickets in the field, and locking devices whereby when any one of the keys of a series or set has been operated the other keys in the said series or set will be locked so as to be inoperative until the machine has been reset for the next voter.

6. A voting-machine provided with special keys for cumulative or fractional voting, each main cumulative key having grouped about it a series of auxiliary keys, and each of the heads of the said main keys being rotatively adjustable and provided with a projecting index, combined with index-plates having notches with which the said projecting indexes may be caused to register and opposite which notches are placed the numbers or fractional numbers of votes to be cast by depressing the said head; whereby when the said head is adjusted so that its projecting index is caused to register with one of said notches, and said key is depressed, the number or fractional number of votes which the voter desires to cast for a candidate may be recorded.

In testimony whereof I affix my signature in presence of two witnesses.

ALEXANDER TURNER.

Witnesses:
HENRY CALVER,
NATHAN H. ROBBINS.